United States Patent
Ohta et al.

(10) Patent No.: US 12,143,853 B2
(45) Date of Patent: Nov. 12, 2024

(54) RECEIVING DEVICE, TRANSMISSION DEVICE, WIRELESS COMMUNICATION SYSTEM, AND COMMUNICATION STATUS REPORTING METHOD

(71) Applicant: FUJITSU LIMITED, Kawasaki (JP)

(72) Inventors: Yoshiaki Ohta, Yokohama (JP); Yoshihiro Kawasaki, Kawasaki (JP); Takayoshi Ode, Yokohama (JP); Nobuhisa Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 226 days.

(21) Appl. No.: 17/227,735

(22) Filed: Apr. 12, 2021

(65) Prior Publication Data

US 2021/0235315 A1 Jul. 29, 2021

Related U.S. Application Data

(63) Continuation of application No. PCT/JP2018/038348, filed on Oct. 15, 2018.

(51) Int. Cl.
*H04W 8/24* (2009.01)
*H04W 24/10* (2009.01)
(Continued)

(52) U.S. Cl.
CPC ......... *H04W 28/0278* (2013.01); *H04W 8/24* (2013.01); *H04W 24/10* (2013.01);
(Continued)

(58) Field of Classification Search
CPC .... H04B 7/02–17; H04B 17/0082–409; H04L 43/02–55; H04L 47/10–83; H04W 8/18–245; H04W 16/02–32; H04W 24/02–10; H04W 28/02–26; H04W 36/0005–385; H04W 48/02–20; H04W 72/02–569; H04W 74/002–008;
(Continued)

(56) References Cited

U.S. PATENT DOCUMENTS

| | | | |
|---|---|---|---|
| 2010/0190504 A1* | 7/2010 | Lee | H04W 48/08 |
| 2012/0236782 A1* | 9/2012 | Bucknell | H04W 72/1221 |
| 2016/0066362 A1* | 3/2016 | Ohta | H04W 76/15 |

FOREIGN PATENT DOCUMENTS

| | | | |
|---|---|---|---|
| CN | 102598825 A | 7/2012 | |
| JP | 2013515420 A * | 5/2013 | ........ H04W 72/1221 |
| JP | 2017-38335 A | 2/2017 | |

OTHER PUBLICATIONS

Written Opinion of the International Searching Authority dated Dec. 25, 2018 for International Application No. PCT/JP2018/038348 filed Oct. 15, 2018, 5 pages. (Year: 2018).*

(Continued)

*Primary Examiner* — Timothy J Weidner
(74) *Attorney, Agent, or Firm* — Myers Wolin, LLC

(57) ABSTRACT

A terminal device (200) includes a wireless communication unit (210) that receives data transmitted from a base station device (100); a reception buffer (231) that can hold the data received by the wireless communication unit (210); and a transmission control unit (222) that can perform control, in accordance with a status of the reception buffer, such that communication status information indicating a reception status of the data is transmitted to the base station device (100).

9 Claims, 5 Drawing Sheets

(51) Int. Cl.
| | |
|---|---|
| *H04W 28/02* | (2009.01) |
| *H04W 28/08* | (2023.01) |
| *H04W 28/12* | (2009.01) |
| *H04W 28/14* | (2009.01) |
| *H04W 36/00* | (2009.01) |
| *H04W 36/02* | (2009.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC ... *H04W 28/0273* (2013.01); *H04W 28/0284* (2013.01); *H04W 28/0289* (2013.01); *H04W 28/0835* (2020.05); *H04W 28/0838* (2020.05); *H04W 28/12* (2013.01); *H04W 28/14* (2013.01); *H04W 36/0069* (2018.08); *H04W 36/023* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ..... H04W 76/10–50; H04W 84/02–16; H04W 88/02–12; H04W 92/02–04; H04W 92/10
See application file for complete search history.

(56) References Cited

OTHER PUBLICATIONS

3GPP TS 36.211 V15.2.0, "3rd Generation Partnership Project; Technical Specification Group Radio Access Network; Evolved Universal Terrestrial Radio Access (E-UTRA); Physical channels and modulation (Release 15)", Jun. 2018.
3GPP TS 36.212 V15.2.1, "3rd Generation Partnership Project; Technical Specification Group Radio Access Network; Evolved Universal Terrestrial Radio Access (E-UTRA); Multiplexing and channel coding (Release 15)", Jul. 2018.
3GPP TS 36.213 V15.2.0, "3rd Generation Partnership Project; Technical Specification Group Radio Access Network; Evolved Universal Terrestrial Radio Access (E-UTRA); Physical layer procedures (Release 15)", Jun. 2018.
3GPP TS 36.300 V15.2.0, "3rd Generation Partnership Project; Technical Specification Group Radio Access Network; Evolved Universal Terrestrial Radio Access (E-UTRA) and Evolved Universal Terrestrial Radio Access Network (E- Utran); Overall description; Stage 2 (Release 15)", Jun. 2018.
3GPP TS 36.321 V15.2.0, "3rd Generation Partnership Project; Technical Specification Group Radio Access Network; Evolved Universal Terrestrial Radio Access (E-UTRA); Medium Access Control (MAC) protocol specification (Release 15)", Jul. 2018.
3GPP TS 36.322 V15.1.0, "3rd Generation Partnership Project; Technical Specification Group Radio Access Network; Evolved Universal Terrestrial Radio Access (E-UTRA); Radio Link Control (RLC) protocol specification (Release 15)", Jul. 2018.
3GPP TS 36.323 V15.0.0, "3rd Generation Partnership Project; Technical Specification Group Radio Access Network; Evolved Universal Terrestrial Radio Access (E-UTRA); Packet Data Convergence Protocol (PDCP) specification (Release 15)", Jul. 2018.
3GPP TS 36.331 V15.2.2, "3rd Generation Partnership Project; Technical Specification Group Radio Access Network; Evolved Universal Terrestrial Radio Access (E-UTRA); Radio Resource Control (RRC); Protocol specification (Release 15)", Jun. 2018.
3GPP TS 36.413 V15.2.0, "3rd Generation Partnership Project; Technical Specification Group Radio Access Network; Evolved Universal Terrestrial Radio Access Network (E-UTRAN); S1 Application Protocol (S1AP) (Release 15)", Jun. 2018.

3GPP TS 36.423 V15.2.0, "3rd Generation Partnership Project; Technical Specification Group Radio Access Network; Evolved Universal Terrestrial Radio Access Network (E-UTRAN); X2 application protocol (X2AP) (Release 15)", Jun. 2018.
3GPP TS 36.425 V15.0.0, "3rd Generation Partnership Project; Technical Specification Group Radio Access Network; Evolved Universal Terrestrial Radio Access Network (E-UTRAN); X2 interface user plane protocol (Release 15)", Jun. 2018.
3GPP TS 37.340 V15.2.0, "3rd Generation Partnership Project; Technical Specification Group Radio Access Network; Evolved Universal Terrestrial Radio Access (E-UTRA) and NR; Multi-connectivity; Stage 2 (Release 15)", Jun. 2018.
3GPP TS 38.201 V15.0.0, "3rd Generation Partnership Project; Technical Specification Group Radio Access Network; NR; Physical layer; General description (Release 15)", Dec. 2017.
3GPP TS 38.202 V15.2.0, "3rd Generation Partnership Project; Technical Specification Group Radio Access Network; NR; Services provided by the physical layer (Release 15)", Jun. 2018.
3GPP TS 38.211 V15.2.0, "3rd Generation Partnership Project; Technical Specification Group Radio Access Network; NR; Physical channels and modulation (Release 15)", Jun. 2018.
3GPP TS 38.212 V15.2.0, "3rd Generation Partnership Project; Technical Specification Group Radio Access Network; NR; Multiplexing and channel coding (Release 15)", Jun. 2018.
3GPP TS 38.213 V15.2.0, "3rd Generation Partnership Project; Technical Specification Group Radio Access Network; NR; Physical layer procedures for control (Release 15)", Jun. 2018.
3GPP TS 38.214 V15.2.0, "3rd Generation Partnership Project; Technical Specification Group Radio Access Network; NR; Physical layer procedures for data (Release 15)", Jun. 2018.
3GPP TS 38.215 V15.2.0, "3rd Generation Partnership Project; Technical Specification Group Radio Access Network; NR; Physical layer measurements (Release 15)", Jun. 2018.
3GPP TS 38.300 V15.2.0, "3rd Generation Partnership Project; Technical Specification Group Radio Access Network; NR; NR and NG-RAN Overall Description; Stage 2 (Release 15)", Jun. 2018.
3GPP TS 38.321 V15.2.0, "3rd Generation Partnership Project; Technical Specification Group Radio Access Network; NR; Medium Access Control (MAC) protocol specification (Release 15)", Jun. 2018.
3GPP TS 38.322 V15.2.0, "3rd Generation Partnership Project; Technical Specification Group Radio Access Network; NR; Radio Link Control (RLC) protocol specification (Release 15)", Jun. 2018.
3GPP TS 38.323 V15.2.0, "3rd Generation Partnership Project; Technical Specification Group Radio Access Network; NR; Packet Data Convergence Protocol (PDCP) specification (Release 15)", Jun. 2018.
3GPP TS 38.331 V15.2.1, "3rd Generation Partnership Project; Technical Specification Group Radio Access Network; NR; Radio Resource Control (RRC) protocol specification (Release 15)", Jun. 2018.
3GPP TS 38.401 V15.2.0, "3rd Generation Partnership Project; Technical Specification Group Radio Access Network; NG-RAN; Architecture description (Release 15)", Jun. 2018.
3GPP TS 38.410 V15.0.0, "3rd Generation Partnership Project; Technical Specification Group Radio Access Network; Ng-Ran; Ng general aspects and principles (Release 15)", Jun. 2018.
3GPP TS 38.413 V15.0.0, "3rd Generation Partnership Project; Technical Specification Group Radio Access Network; NG-RAN; NG Application Protocol (NGAP) (Release 15)", Jun. 2018.
3GPP TS 38.420 V15.0.0, "3rd Generation Partnership Project; Technical Specification Group Radio Access Network; NG-RAN; Xn general aspects and principles (Release 15)", Jun. 2018.
3GPP TS 38.423 V15.0.0, "3rd Generation Partnership Project; Technical Specification Group Radio Access Network; NG-RAN; Xn application protocol (XnAP) (Release 15)", Jun. 2018.
3GPP TS 38.470 V15.2.0, "3rd Generation Partnership Project; Technical Specification Group Radio Access Network; NG-RAN; F1 general aspects and principles (Release 15)", Jun. 2018.
3GPP TS 38.473 V15.2.1, "3rd Generation Partnership Project; Technical Specification Group Radio Access Network; NG-RAN; F1 application protocol (F1AP) (Release 15)", Jul. 2018.

(56) References Cited

OTHER PUBLICATIONS

3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.900 V15.0.0, "3rd Generation Partnership Project; Technical Specification Group Radio Access Network; Study on channel model for frequency spectrum above 6 GHZ (Release 15)", Jun. 2018.
3GPP TR 38.912 V15.0.0, "3rd Generation Partnership Project; Technical Specification Group Radio Access Network; Study on New Radio (NR) access technology (Release 15)", Jun. 2018.
3GPP TR 38.913 V15.0.0, "3rd Generation Partnership Project; Technical Specification Group Radio Access Network; Study on Scenarios and Requirements for Next Generation Access Technologies; (Release 15)", Jun. 2018.
3GPP TR 36.133 V15.3.0, 3rd Generation Partnership Project; Technical Specification Group Radio Access Network; Evolved Universal Terrestrial Radio Access (E-UTRA); Requirements for support of radio resource management (Release 15), Jun. 2018.
Qualcomm Incorporated, "Flow control using highest sequence No. acceptable by the receiver", Agenda Item: 10.3.3.7, 3GPP TSG-RAN WG2 Meeting #101, R2-1803622, Athens, Greece, Feb. 26-Mar. 2, 2018.
Huawei et al., "Considerations for BSR in EN-DC", Agenda Item: 10.3.1.6, 3GPP TSG-RAN WG2 Meeting #99bis, R2-1710783, Prague, Czech Republic, Oct. 9-13, 2017.
First Notification of Office Action and Search Report issued by the China National Intellectual Property Administration for corresponding Chinese Patent Application No. 201880098698.1, mailed on Jun. 4, 2023, with an English translation.

* cited by examiner

| LCG ID | BUFFER SIZE/MAXIMUM SIZE |
|---|---|

| LCG₇ | LCG₆ | LCG₅ | LCG₄ | LCG₃ | LCG₂ | LCG₁ | LCG₀ |
|---|---|---|---|---|---|---|---|
| BUFFER SIZE 1/MAXIMUM SIZE ||||||||
| BUFFER SIZE 2/MAXIMUM SIZE ||||||||
| ... ||||||||
| BUFFER SIZE m/MAXIMUM SIZE ||||||||

RECEIVING DEVICE, TRANSMISSION DEVICE, WIRELESS COMMUNICATION SYSTEM, AND COMMUNICATION STATUS REPORTING METHOD

CROSS-REFERENCE TO RELATED APPLICATION

This application is a continuation of International Application No. PCT/JP2018/038348, filed on Oct. 15, 2018, the entire contents of which are incorporated herein by reference.

FIELD

The embodiments discussed herein are related to a receiving device, a transmission device, a wireless communication system, and a communication status reporting method.

BACKGROUND

In the current networks, traffic of mobile terminals (smartphones and feature phones) occupies most of network resources. Furthermore, traffic used by mobile terminals tends to be continuously increased in the future.

In contrast, with the development of Internet of things (IoT) services (for example, transportation systems, smart meters and monitoring systems for devices and the like), there is a need to cope with services with various kinds of requirements. Thus, in the communication standards for the fifth generation mobile communication (5G or new radio (NR)), in addition to the standard technology of the fourth generation mobile communication (4G) (for example, Non-Patent Documents 1 to 11), there is a demand for a technology that implements high-data-rate, high-capacity, and low-delay communication. Furthermore, regarding the fifth generation communication standards, technical studies are being conducted in 3GPP working groups (for example, TSG-RAN WG1, TSG-RAN WG2, and the like). (Non-Patent Documents 12 to 40).

(Non-Patent Documents 12 to 39)

As described above, in 5G, in order to deal with various kinds of services, support of a lot of use cases classified into enhanced mobile broadband (eMBB), machine type communications (Massive MTC), and ultra-reliable and low latency communication (URLLC) is conceived.

Furthermore, in the communication standards for a wireless communication system, in general, specifications are prescribed in a way of a protocol stack (also referred to as a hierarchical protocol) obtained by dividing a function of wireless communication into a series of layers. For example, a physical layer is prescribed as the first layer, a data link layer is prescribed as the second layer, and a network layer is prescribed as the third layer. In the fourth generation mobile communication system, such as Long Term Evolution (LTE), the second layer is divided into a plurality of sublayers and is constituted by a medium access control (MAC) layer, a radio link control (RLC) layer, and a packet data convergence protocol (PDCP) layer. Furthermore, in the fourth generation mobile communication system, the first layer is constituted by a physical (PHY) layer and the third layer is constituted by a radio resource control (RRC) layer (RRC layer is only for the control plane). Furthermore, as described above, because the MAC layer, the RLC layer, and the PDCP layer are the sublayers of the second layer, these layers may also be referred to as a MAC sublayer, a RLC sublayer, and a PDCP sublayer.

In the 4G and 5G wireless communication system, Dual Connectivity (DC) is sometimes performed in which a terminal device performs communication by simultaneously connecting to two base stations, i.e., a master base station and a secondary base station. When DC is performed, in the PDCP layer in the master base station, a packet is distributed to the master base station and the secondary base station, and the distributed packet is transmitted in accordance with scheduling performed in the MAC layer in each of the base station devices. In this way, because the packet is transmitted from these two base station devices, a memory area associated with each of the base station devices is sometimes provided in the terminal device that receives the packet. Namely, a buffer area for the master base station and a buffer area for the secondary base station are sometimes provided in the reception buffer in the terminal device. Studies have been conducted on dynamically changing the size of these buffer areas.

Non-Patent Document 1: 3GPP TS 36.133 V15.3.0 (2018-06)
Non-Patent Document 2: 3GPP TS 36.211 V15.2.0 (2018-06)
Non-Patent Document 3: 3GPP TS 36.212 V15.2.1 (2018-07)
Non-Patent Document 4: 3GPP TS 36.213 V15.2.0 (2018-06)
Non-Patent Document 5: 3GPP TS 36.300 V15.2.0 (2018-06)
Non-Patent Document 6: 3GPP TS 36.321 V15.2.0 (2018-07)
Non-Patent Document 7: 3GPP TS 36.322 V15.1.0 (2018-07)
Non-Patent Document 8: 3GPP TS 36.323 V15.0.0 (2018-07)
Non-Patent Document 9: 3GPP TS 36.331 V15.2.2 (2018-06)
Non-Patent Document 10: 3GPP TS 36.413 V15.2.0 (2018-06)
Non-Patent Document 11: 3GPP TS 36.423 V15.2.0 (2018-06)
Non-Patent Document 12: 3GPP TS 36.425 V15.0.0 (2018-06)
Non-Patent Document 13: 3GPP TS 37.340 V15.2.0 (2018-06)
Non-Patent Document 14: 3GPP TS 38.201 V15.0.0 (2017-12)
Non-Patent Document 15: 3GPP TS 38.202 V15.2.0 (2018-06)
Non-Patent Document 16: 3GPP TS 38.211 V15.2.0 (2018-06)
Non-Patent Document 17: 3GPP TS 38.212 V15.2.0 (2018-06)
Non-Patent Document 18: 3GPP TS 38.213 V15.2.0 (2018-06)
Non-Patent Document 19: 3GPP TS 38.214 V15.2.0 (2018-06)
Non-Patent Document 20: 3GPP TS 38.215 V15.2.0 (2018-06)
Non-Patent Document 21: 3GPP TS 38.300 V15.2.0 (2018-06)
Non-Patent Document 22: 3GPP TS 38.321 V15.2.0 (2018-06)
Non-Patent Document 23: 3GPP TS 38.322 V15.2.0 (2018-06)
Non-Patent Document 24: 3GPP TS 38.323 V15.2.0 (2018-06)

Non-Patent Document 25: 3GPP TS 38.331 V15.2.1 (2018-06)
Non-Patent Document 26: 3GPP TS 38.401 V15.2.0 (2018-06)
Non-Patent Document 27: 3GPP TS 38.410 V15.0.0 (2018-06)
Non-Patent Document 28: 3GPP TS 38.413 V15.0.0 (2018-06)
Non-Patent Document 29: 3GPP TS 38.420 V15.0.0 (2018-06)
Non-Patent Document 30: 3GPP TS 38.423 V15.0.0 (2018-06)
Non-Patent Document 31: 3GPP TS 38.470 V15.2.0 (2018-06)
Non-Patent Document 32: 3GPP TS 38.473 V15.2.1 (2018-07)
Non-Patent Document 33: 3GPP TR 38.801 V14.0.0 (2017-03)
Non-Patent Document 34: 3GPP TR 38.802 V14.2.0 (2017-09)
Non-Patent Document 35: 3GPP TR 38.803 V14.2.0 (2017-09)
Non-Patent Document 36: 3GPP TR 38.804 V14.0.0 (2017-03)
Non-Patent Document 37: 3GPP TR 38.900 V15.0.0 (2018-06)
Non-Patent Document 38: 3GPP TR 38.912 V15.0.0 (2018-06)
Non-Patent Document 39: 3GPP TR 38.913 V15.0.0 (2018-06)
Non-Patent Document 40: Qualcomm Incorporated, "Flow control using highest sequence number acceptable by the receiver", 3GPP TSG-RAN WG2 #101, R2-1803622, 26 February to 2 Mar. 2018

However, there is a problem in that overflow occurs depending on the size of the buffer areas, and thus, throughput is decreased. For example, a case is considered in which, in DC, the size of the buffer area for the master base station is set to be relatively large and the size of the buffer area for the secondary base station is set to be relatively small. At this time, if a radio channel between the master base station and the terminal device becomes a defective condition, a lot of packets is distributed to the secondary base station and transmitted to the terminal device. Consequently, in the terminal device, overflow occurs in the buffer area for the secondary base station that is set to be relatively small and retransmission of the packet frequently occurs, whereby the throughput is decreased.

This problem does not occur only in DC and occurrence of overflow in the reception buffer causes a reduction in throughput.

SUMMARY

According to an aspect of an embodiment, a receiving device includes: a receiver configured to receive data transmitted from a transmission device; a reception buffer configured to hold the data received by the receiver; and a processor configured to perform control, in accordance with a status of the reception buffer, such that communication status information indicating a reception status of the data is transmitted to the transmission device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Furthermore, the present invention is not limited to the embodiments.

[a] First Embodiment

Figure 1:
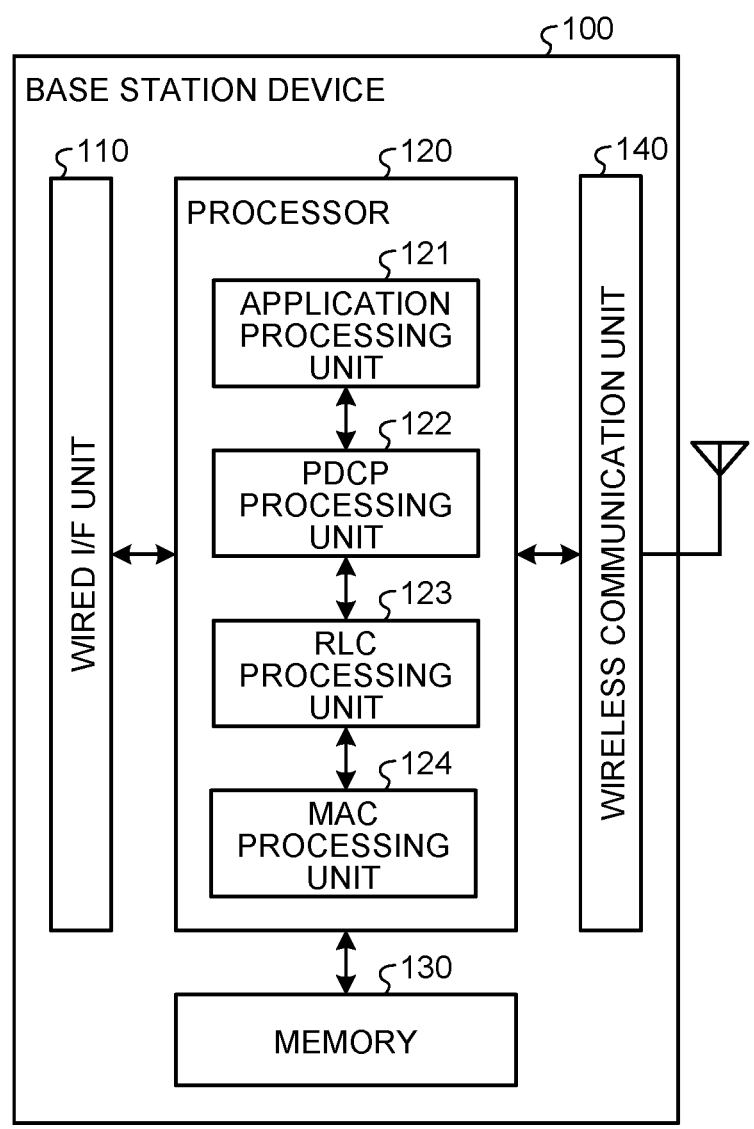
FIG. 1 is a block diagram illustrating a configuration of a base station device according to an embodiment.

FIG. 1 is a block diagram illustrating a configuration of a base station device 100 according to a first embodiment. The base station device 100 illustrated in FIG. 1 includes a wired interface unit (hereinafter, simply referred to as a "wired I/F unit") 110, a processor 120, a memory 130, and a wireless communication unit 140.

The wired I/F unit 110 has an interface for connecting to another base station device and a core network and transmits and receives data to and from the other base station device and the core network.

The processor 120 includes, for example, a central processing unit (CPU), a field programmable gate array (FPGA), a digital signal processor (DSP), or the like and performs overall control of the base station device 100. Specifically, the processor 120 includes an application processing unit 121, a packet data convergence protocol (PDCP) processing unit 122, a radio link control (RLC) processing unit 123, and a medium access control (MAC) processing unit 124.

The application processing unit 121 performs processes of various applications. For example, the application processing unit 121 generates transmission data transmitted by a downlink line from the base station device 100 toward the terminal device, which will be described later.

The PDCP processing unit 122 performs a process on the PDCP layer. For example, the PDCP processing unit 122 adds a header of the PDCP layer to the packet (PDCP-SDU) of the transmission data generated by the application processing unit 121, and then, generates PDCP-PDU.

The RLC processing unit 123 performs a process on the RLC layer which is lower than the PDCP layer. For example, the RLC processing unit 123 adds, by considering the PDCP-PDU generated by the PDCP processing unit 122 as RLC-SDU, a header of the RLC layer to the RLC-SDU and generates RLC-PDU. The process performed on the RLC layer by the RLC processing unit 123 includes, for example, retransmission control of packets and the like.

The MAC processing unit 124 performs a process on the MAC layer which is lower than the PDCP layer and the RLC layer. For example, the MAC processing unit 124 adds, by considering the RLC-PDU generated by the RLC processing unit 123 as MAC-SDU, a header of the MAC layer to the MAC-SDU and generates MAC-PDU. The process performed on the MAC layer by the MAC processing unit 124 includes, for example, scheduling of packets, priority control, and the like. In the priority control performed by the MAC processing unit 124, for example, logical channel prioritization (LCP) that controls priority of the logical channel is performed. Specifically, a logical channel group (LCG) is generated by aggregating logical channels having the same Quality of Service (Qos) to be required and the priority control is performed for each LCG.

Furthermore, in the scheduling performed by the MAC processing unit 124, transmission frequency of the packet to the terminal device, which will be described later, is controlled. At this time, the MAC processing unit 124 refers to reception buffer information received from the terminal device and controls the transmission frequency of the packet in accordance with an available status of the reception buffer in the terminal device. Namely, for example, when the reception buffer in the terminal device is likely to overflow, the MAC processing unit 124 temporarily stops transmission of the packet to the terminal device or reduces the transmission frequency.

The memory 130 includes, for example, a random access memory (RAM), a read only memory (ROM), or the like and stores information that is used by the processor 120 to perform processes.

The wireless communication unit 140 performs a wireless transmission process of, for example, digital/analog (D/A) conversion and up-conversion on the transmission data generated by the processor 120 and performs wireless transmission via an antenna. Furthermore, the wireless communication unit 140 performs wireless reception process of, for example, down-conversion and analog/digital (A/D) conversion on the reception data wirelessly received via the antenna and outputs the data to the processor 120.

Figure 2:
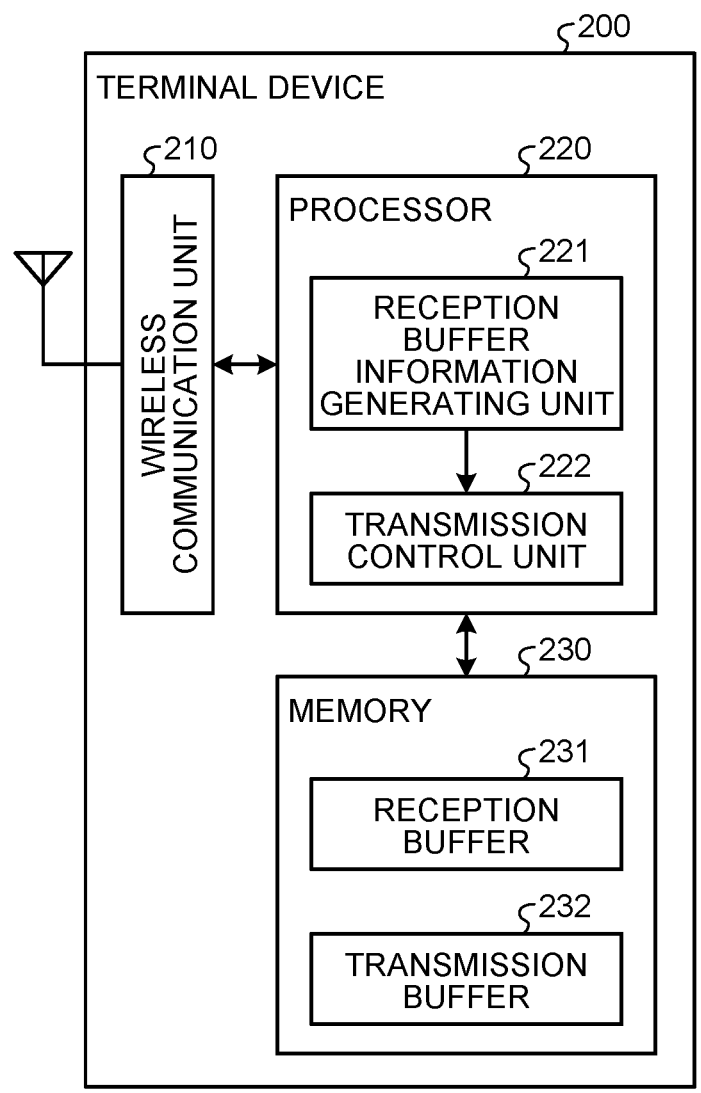
FIG. 2 is a block diagram illustrating a configuration of a terminal device according to an embodiment.

FIG. 2 is a block diagram illustrating a configuration of a terminal device 200 according to the embodiment. The terminal device 200 illustrated in FIG. 2 includes a wireless communication unit 210, a processor 220, and a memory 230.

The wireless communication unit 210 performs wireless reception process of, for example, down-conversion and A/D conversion on the reception data that has been wirelessly received via the antenna, and then, outputs the data to the processor 220. Furthermore, the wireless communication unit 210 performs wireless transmission process of, for example, D/A conversion and up-conversion on the transmission data generated by the processor 220 and performs wireless transmission via the antenna. The transmission data transmitted from the wireless communication unit 210 includes, for example, the reception buffer information transmitted to the base station device 100.

The processor 220 includes, for example, a CPU, an FPGA, a DSP, or the like and performs overall control of the terminal device 200. Specifically, the processor 220 includes a reception buffer information generating unit 221 and a transmission control unit 222.

The reception buffer information generating unit 221 generates reception buffer information in accordance with the amount of data stored in the reception buffer. For example, the reception buffer information generating unit 221 judges whether the reporting condition of the information related to the reception buffer in the terminal device 200 to be reported to the base station device 100 is satisfied and, if the reporting condition is satisfied, the reception buffer information generating unit 221 generates the reception buffer information related to the reception buffer. The reporting condition is, for example, a status in which a predetermined reporting period of time that is configured in advance arrives, a status in which an amount of data stored in the reception buffer reaches greater than or equal to a predetermined threshold, and the like. If these reporting conditions are satisfied, the reception buffer information generating unit 221 may also generate reception buffer information that relatively represents the buffer size indicating the amount of data that is actually being held in the reception buffer with respect to the maximum size indicating the maximum amount of data that can be held by the reception buffer.

The transmission control unit 222 allows the wireless communication unit 210 to transmit the reception buffer information generated by the reception buffer information generating unit 221 to the base station device 100.

The memory 230 includes, for example, a RAM, a ROM, or the like and stores information that is used by the processor 220 to perform processes. A reception buffer 231 and a transmission buffer 232 are provided in the storage area of the memory 230.

The reception buffer 231 temporarily stores therein the data received from the base station device 100. The data held by the reception buffer 231 is deleted from the reception buffer 231 after a reception process is performed by, for example, an application.

The transmission buffer 232 temporarily stores therein the data that is to be transmitted to the base station device 100. The data held by the transmission buffer 232 is deleted from the transmission buffer 232 after the data is transmitted to the base station device 100.

In the following, an operation of the base station device 100 and the terminal device 200 according to the first embodiment will be described. The base station device 100 transmits data from the wireless communication unit 140 to the terminal device 200. The terminal device 200 receives, by the wireless communication unit 210, the data transmitted from the base station device 100 and holds the data in the reception buffer 231.

After that, the processor 220 in the terminal device 200 performs control so as to transmit, in accordance with the amount of data held by the reception buffer 231, buffer information (communication status information) indicating the reception status of the data from the wireless communication unit 210.

The wireless communication unit 210 in the terminal device 200 transmits the buffer information to the base station device 100 in accordance with the control performed by the processor 220.

The wireless communication unit 140 in the base station device 100 receives the buffer information and the processor 120 in the base station device 100 can adjust scheduling of data to be transmitted from the wireless communication unit 140 in accordance with the received buffer information.

As described above, according to the first embodiment, the terminal device transmits, in accordance with the status of the reception buffer, the reception buffer information related to the reception buffer to the base station device. Then, the base station device can adjust scheduling in accordance with the reception buffer information. Consequently, if the reception buffer in the terminal device is likely to overflow, it is possible to reduce the transmission frequency of data to the terminal device. As a result, it is possible to prevent overflow of the reception buffer in the terminal device and it is thus possible to suppress a reduction in throughput.

Furthermore, in the first embodiment described above, a description has been given of a case in which the reception buffer information related to the reception buffer 231 in the terminal device 200 is transmitted to the base station device 100; however, the reception buffer information related to the reception buffer in the base station device may also be transmitted to the terminal device. In this case, if the reception buffer in the base station device is likely to overflow, the terminal device that has received the reception buffer information related to the base station device temporarily stops the data transmission with respect to the base station device or decreases the transmission frequency of data. By doing so, it is possible to prevent overflow of the reception buffer in the base station device and it is thus possible to suppress a reduction in throughput.

[b] Second Embodiment

In the first embodiment, a description has been given of an example in which the terminal device 200 transmits the reception buffer information related to the reception buffer 231 to the base station device 100 in accordance with the amount of data held by the reception buffer 231 and the base station device 100 can accordingly adjust scheduling in accordance with the received buffer information. In a second embodiment, a specific example of a communication status reporting method will be described. Furthermore, the configurations of the base station device 100 and the terminal device 200 are the same as those described in the first embodiment; therefore, descriptions thereof will be omitted.

Figure 3:
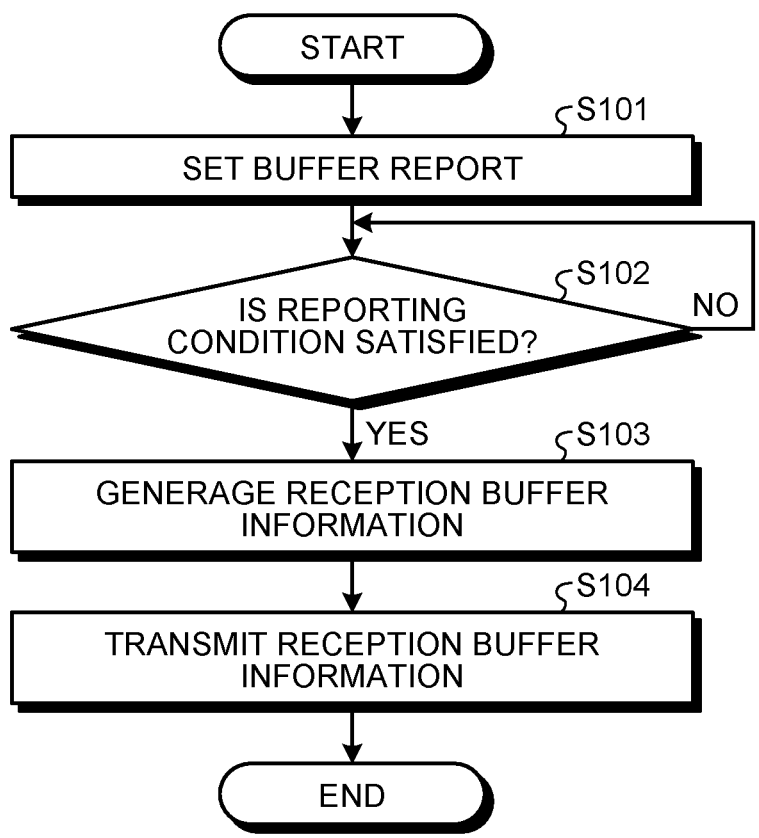
FIG. 3 is a flowchart illustrating a communication status reporting method according to an embodiment.

The communication status reporting method performed by the terminal device 200 will be described by considering the flowchart illustrated in FIG. 3.

At the start of communication between the base station device 100 and the terminal device 200, a configuration related to a report about the reception buffer 231 from the terminal device 200 to the base station device 100 is performed by using, for example, radio resource control (RRC) signaling (Step S101). Here, for example, a reporting condition is set, or a reporting method is set, such as the amount of data held by the reception buffer 231 to be reported by using an absolute value or a relative value.

After the configuration related to the buffer report has been performed, the data transmitted from the base station device 100 is received by the wireless communication unit 210 and is temporarily held by the reception buffer 231. When the reception process has been performed on the data held by the reception buffer 231, the data is deleted from the reception buffer 231.

During this period of time, it is judged, by the reception buffer information generating unit 221, whether the reporting condition related to the reception buffer 231 is satisfied (Step S102). Namely, if the reporting condition is a case in which, for example, an amount of data stored in the reception buffer 231 is greater than or equal to a predetermined threshold, the amount of data stored in the reception buffer 231 is monitored by the reception buffer information generating unit 221. Then, if the amount of data stored in the reception buffer 231 is greater than or equal to the predetermined threshold and it is judged, by the reception buffer information generating unit 221, that the reporting condition is satisfied (Yes at Step S102), the reception buffer information is generated (Step S103).

In the following, the reception buffer information in a case in which the amount of data held by the reception buffer 231 is reported by using a relative value will be described. In this case, the reception buffer information relatively represents the buffer size indicating the amount of data that is actually held by the reception buffer 231 with respect to the maximum size of the maximum amount of data that can be held by the reception buffer 231. Namely, the reception buffer information is information indicating occupancy of the reception buffer 231. Then, for example, as illustrated in the upper part of FIG. 4, the ratio of the buffer size to the maximum size is included in the reception buffer information in association with the identification information on LCG that is the logical channel group associated with the data held by the reception buffer 231.

Figures 4, 5:
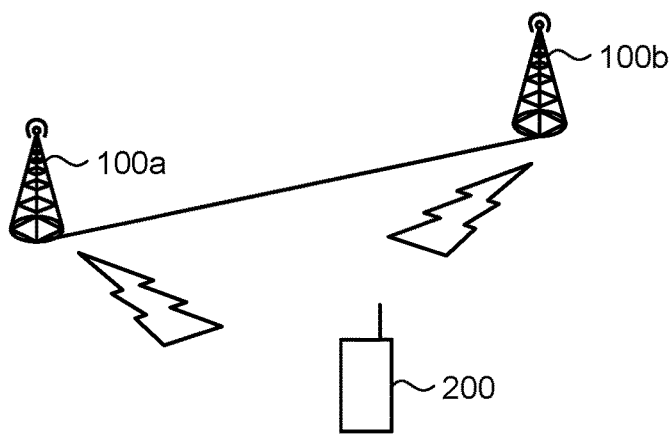
FIG. 4 is a diagram illustrating a specific example of a format of reception buffer information.
FIG. 5 is a diagram illustrating an example of a wireless communication system.

Furthermore, when data on a plurality of LCGs is held by the reception buffer 231, for example, as illustrated on the lower part of FIG. 4, identification information ($LCG_0$ to 7) on each of the LCGs and the buffer size (buffer size 1 to m) related to each of the LCGs with respect to the maximum size is included in the reception buffer information.

Because the reception buffer information described above is information indicating the communication status of the base station device 100 and the terminal device 200 that is determined in accordance with the status of the reception buffer 231, the reception buffer information can also be referred to as communication status information. Because the amount of data stored in the reception buffer 231 is represented by this type of relative value, it is possible to determine whether the reception buffer 231 is likely to overflow. Namely, the reception buffer information makes it possible to accurately determine a risk of overflow of the reception buffer 231.

When the reception buffer information is generated by the reception buffer information generating unit 221, transmission of the reception buffer information is performed by the transmission control unit 222. Namely, an instruction is given from the transmission control unit 222 to the wireless communication unit 210, whereby the reception buffer information is transmitted from the wireless communication unit 210 to the base station device 100 (Step S104).

The base station device 100 that receives the reception buffer information adjusts scheduling in accordance with the reception buffer information. Namely, when the MAC processing unit 124 in the base station device 100 detects, from the reception buffer information, that the reception buffer 231 in the terminal device 200 is likely to overflow, the MAC processing unit 124 reduces the transmission frequency of the data to the terminal device 200. Consequently, it is possible to prevent overflow of the reception buffer 231 and it is thus possible to suppress a reduction in throughput.

As described above, according to the embodiment, if the reporting condition is satisfied, the terminal device transmits the reception buffer information related to the reception buffer to the base station device. Then, the base station device adjusts scheduling in accordance with the reception buffer information. Consequently, if the reception buffer in the terminal device is likely to overflow, it is possible to reduce the transmission frequency of the data to the terminal device. As a result, it is possible to prevent overflow of the reception buffer in the terminal device and it is thus possible to suppress a reduction in throughput.

Furthermore, in the second embodiment described above, a description has been given of a case in which the reception buffer information related to the reception buffer 231 in the terminal device 200 is transmitted to the base station device 100; however, the reception buffer information related to the reception buffer in the base station device may also be transmitted to the terminal device. In this case, if the reception buffer in the base station device is likely to overflow, the terminal device that has received the reception buffer information on the base station device temporarily stops data transmission with respect to the base station device or reduces the transmission frequency of the data. By doing so, it is possible to prevent overflow of the reception buffer in the base station device and it is thus possible to suppress a reduction in throughput.

[c] Third Embodiment

In the third embodiment, a case in which the terminal device 200 performs dual connectivity (DC) will be described. Furthermore, in the following, a description will be given of an example of dual connectivity based on the second embodiment; however, the method described in the first embodiment may also be used. Furthermore, regarding the configurations of the base station device 100 and the terminal device 200, descriptions of the same configurations as those of the first and the embodiments will be omitted.

FIG. 5 is a diagram illustrating an example of a wireless communication system in a case in which the terminal device 200 performs dual connectivity. In FIG. 5, the terminal device 200 performs dual connectivity on a master base station 100a and a secondary base station 100b. Each of the master base station 100a and the secondary base station 100b transmits data to the terminal device 200.

Figure 6:
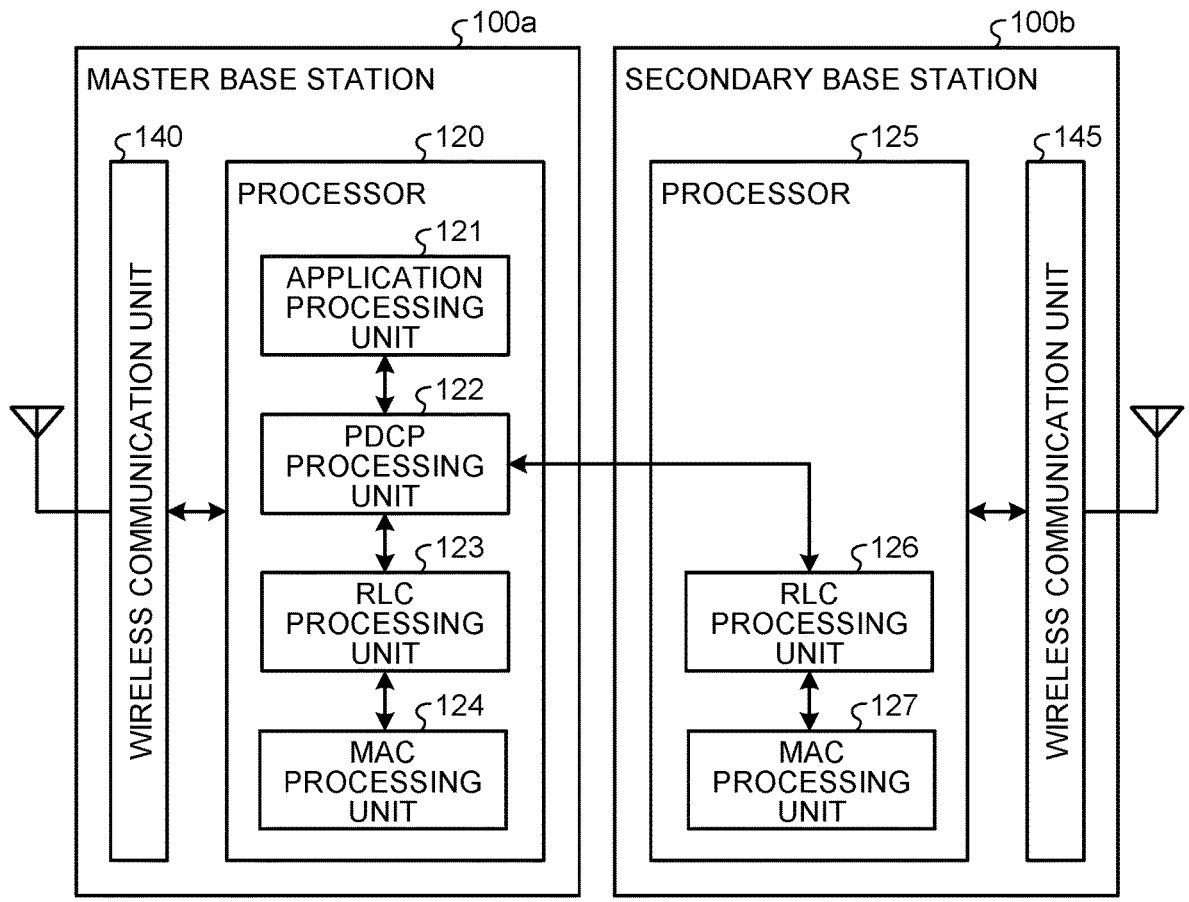
FIG. 6 is a block diagram illustrating a configuration of a base station device at the time of dual connectivity.

FIG. 6 is a block diagram illustrating the master base station 100a and the secondary base station 100b. In FIG. 6, components that are the same as those illustrated in FIG. 1 are assigned the same reference numerals and descriptions thereof will be omitted.

As illustrated in FIG. 6, the master base station 100a has the same configuration as that of the base station device 100 illustrated in FIG. 1. However, in FIG. 6, illustration of the wired I/F unit 110 and the memory 130 is omitted. Furthermore, the PDCP processing unit 122 adds a sequence number to the packet addressed to the terminal device 200 and distributes each of the packets to the RLC processing unit 123 and the secondary base station 100b in the own base station.

The secondary base station 100b includes a processor 125 and a wireless communication unit 145, and the processor 125 includes an RLC processing unit 126 and a MAC processing unit 127.

The RLC processing unit 126 performs a process of the RLC layer with respect to the packet distributed from the PDCP processing unit 122 in the master base station 100a. For example, the RLC processing unit 126 adds, by considering the PDCP-PDU distributed from the PDCP processing unit 122 in the master base station 100a as RLC-SDU, a header of the RLC layer to the RLC-SDU and generates RLC-PDU. The process performed on the RLC layer by the RLC processing unit 126 includes, for example, retransmission control of packets and the like.

The MAC processing unit 127 performs a process on the MAC layer whose level is lower than that of the PDCP layer and the RLC layer. For example, the MAC processing unit 127 adds, by considering the RLC-PDU generated by the RLC processing unit 126 as MAC-SDU, a header of the MAC layer to the MAC-SDU and generates MAC-PDU.

The process performed by the MAC processing unit 127 on the MAC layer includes, for example, scheduling of packets, priority control, and the like.

The wireless communication unit 145 performs a wireless transmission process of, for example, D/A conversion and up-conversion on the transmission data generated by the processor 125 and performs wireless transmission via the antenna. Furthermore, the wireless communication unit 145 performs a wireless reception process of, for example, down-conversion and A/D conversion on the reception data that has been wirelessly received via the antenna and outputs the data to the processor 125.

Figure 7:
FIG. 7 is a diagram illustrating a specific example of a configuration of a reception buffer.

In contrast, the terminal device 200 includes a buffer associated with each of the master base station 100a and the secondary base station 100b. Namely, for example, as illustrated in FIG. 7, in the reception buffer 231 in the terminal device 200, a buffer area for the master base station and a buffer area for the secondary base station are provided. The boundary of these buffer areas may also be dynamically changed. Accordingly, for example, if the size of the buffer area for the secondary base station is small, overflow tends to occur in the buffer area for the secondary base station.

In this case, the terminal device 200 transmits the reception buffer information related to the master base station 100a and transmits the reception buffer information related to the secondary base station 100b. Namely, the ratio of the buffer size to the maximum size in the buffer area for the master base station is reported to the master base station 100a and the ratio of the buffer size to the maximum size in the buffer area for the secondary base station is reported to the secondary base station 100b. In response to this report, the MAC processing units 124 and 127 in each of the base station devices adjust scheduling with respect to the terminal device 200. Consequently, it is possible to prevent overflow of the buffer area for the master base station and the buffer area for the secondary base station and it is thus possible to suppress a reduction in throughput.

As described above, in the third embodiment, even in a case of DC, in accordance with an amount of data of the reception buffer, the terminal device transmits the reception buffer information related to the buffer area for the master base station to the master base station 100a and transmits the reception buffer information related to the buffer area for the secondary base station to the secondary base station 100b. Each of the base station devices makes it possible to adjust scheduling in accordance with the reception buffer information received from the terminal device. Consequently, if the reception buffer in the terminal device is likely to overflow, it is possible to reduce the transmission frequency of data to the terminal device. As a result, it is possible to prevent overflow of the reception buffer in the terminal device and it is thus possible to suppress a reduction in throughput.

According to an aspect of an embodiment of the receiving device, the transmission device, the wireless communication system, and the communication status reporting method disclosed in the present invention, an advantage is provided in that it is possible to suppress a reduction in throughput.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A terminal device comprising:
a receiver configured to receive data transmitted from each of a plurality of base station devices;
a reception buffer configured to hold the data received by the receiver, the reception buffer having a plurality of buffer areas that are associated with the plurality of corresponding base station devices and that hold the data transmitted from the corresponding base station devices; and
processor circuitry configured to perform control, in accordance with an amount of first data that is received from a first base station device among the plurality of base station devices and is stored by the reception buffer, such that communication status information indicating a reception status of the first data is transmitted to the first base station device.

2. The terminal device according to claim 1, wherein the processor circuitry is configured to
generate the communication status information in accordance with the amount of first data, and
perform control such that the communication status information generated is transmitted.

3. The terminal device according to claim 2, wherein the processor circuitry is configured to generate the communication status information indicating a ratio of the amount of first data that is actually held in the reception buffer to a maximum amount of first data that can be held by the reception buffer.

4. The terminal device according to claim 2, wherein, when a condition in which the amount of first data stored in the reception buffer reaches greater than or equal to a predetermined threshold is satisfied, the processor circuitry generates the communication status information.

5. The terminal device according to claim 2, wherein
the processor circuitry generates the communication status information related to each of the plurality of buffer areas.

6. The terminal device according to claim 1, wherein the processor circuitry is configured to perform control, in accordance with an amount of second data that is received from a second base station device among the plurality of base station devices and is stored by the reception buffer, such that second communication status information indicating a reception status of the second data is transmitted to the second base station device.

7. A base station device among a plurality of base station devices, the base station device comprising:
a transmitter configured to transmit data to a terminal device;
a receiver configured to receive, in accordance with an amount of data that is received from the base station device and is stored by a reception buffer in the terminal device, communication status information indicating a reception status of the data, the reception buffer having a plurality of buffer areas that are associated with the plurality of corresponding base station devices, and that hold the data transmitted from the corresponding base station devices; and
processor circuitry configured to adjust, in accordance with the communication status information received by the receiver, scheduling of data transmission performed by the transmitter.

8. A wireless communication system comprising:
a plurality of base station devices; and
a terminal device, wherein
the terminal device includes
a first receiver configured to receive data transmitted from each of the plurality of base station devices,
a reception buffer configured to hold the data received by the first receiver, the reception buffer having a plurality of buffer areas that are associated with the plurality of corresponding base station devices and that hold the data transmitted from the corresponding base station devices, and
first processor circuitry configured to perform control, in accordance with an amount of first data that is received from a first base station device among the plurality of base station devices and is stored by the reception buffer, such that communication status information indicating a reception status of the first data is transmitted to the first base station device, and
the first base station device includes
a transmitter configured to transmit the data to the terminal device,
a second receiver configured to receive the communication status information transmitted from the terminal device, and
second processor circuitry configured to adjust, in accordance with the communication status information received by the second receiver, scheduling of data transmission performed by the transmitter.

9. A communication status reporting method comprising:
receiving data transmitted from each of a plurality of base station devices;
holding the received data in a reception buffer, the reception buffer having a plurality of buffer areas that are associated with the plurality of corresponding base station devices, and that hold the receive data in the plurality of corresponding buffer areas; and
controlling, in accordance with an amount of first data that is received from a first base station device among the plurality of base station devices and is stored by the reception buffer, such that communication status information indicating a reception status of the first data is transmitted to the first base station device.

* * * * *